(12) United States Patent
Takei

(10) Patent No.: US 8,305,626 B2
(45) Date of Patent: Nov. 6, 2012

(54) COMPUTER READABLE STORAGE MEDIUM WITH PRINTER DRIVER STORED THEREIN FOR EFFECTING A SETTING CHANGE

(75) Inventor: Noriyuki Takei, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 693 days.

(21) Appl. No.: 12/560,249

(22) Filed: Sep. 15, 2009

(65) Prior Publication Data

US 2010/0097654 A1   Apr. 22, 2010

(30) Foreign Application Priority Data

Oct. 17, 2008 (JP) ................................. 2008-268323

(51) Int. Cl.
*G06K 15/00* (2006.01)
*G06F 3/12* (2006.01)

(52) U.S. Cl. ...................... 358/1.16; 358/1.13

(58) Field of Classification Search .................. 358/1.1, 358/1.9, 1.13, 1.14, 1.15, 1.16, 1.18; 709/200–220
See application file for complete search history.

(56) References Cited

U.S. PATENT DOCUMENTS

| | | | | |
|---|---|---|---|---|
| 7,057,747 B1 * | 6/2006 | Minagawa | | 358/1.13 |
| 7,161,711 B2 * | 1/2007 | Mori et al. | | 358/1.9 |
| 7,209,250 B2 * | 4/2007 | Nakao | | 358/1.15 |
| 7,630,094 B2 * | 12/2009 | Kitahara et al. | | 358/1.15 |
| 7,839,516 B2 * | 11/2010 | Tomita et al. | | 358/1.15 |
| 7,916,332 B2 * | 3/2011 | Kato | | 358/1.15 |
| 8,144,346 B2 * | 3/2012 | Sakikawa | | 358/1.13 |
| 8,149,431 B2 * | 4/2012 | Barton et al. | | 358/1.13 |
| 2008/0088865 A1 | 4/2008 | Nagai | | 358/1.13 |

FOREIGN PATENT DOCUMENTS

JP   11-149361   6/1999
JP   2008-117366   5/2008

* cited by examiner

*Primary Examiner* — Gabriel Garcia

(74) *Attorney, Agent, or Firm* — DLA Piper LLP (US)

(57) ABSTRACT

A computer readable storage medium in which a printer driver is stored is provided. The printer driver causes a computer to operate as a computing apparatus including: a memorizing unit that memorizes a plurality of set value combinations in each of which a set value is associated with each setting item; a selection accepting unit that displays information indicating the set value combinations in a selectable manner and accepts selection of at least one set value combination; and a set value changing unit that applies, to a part of setting items for which values have already been set, a set value for a setting item included in the set value combination the selection of which has been accepted by the selection accepting unit so as to effect a change.

5 Claims, 7 Drawing Sheets

COMPUTER READABLE STORAGE MEDIUM WITH PRINTER DRIVER STORED THEREIN FOR EFFECTING A SETTING CHANGE

BACKGROUND

1. Technical Field

The present invention relates to a computer readable storage medium in which a printer driver is stored.

2. Related Art

There are various items of print settings that can be set by means of a printer driver. The settable items include, for example, page imposition, data superposition such as form overlay, stamping, and the like as well as settable parameters for adjusting image quality.

These days, as the functions of a printer and those of a printer driver diversify, the number of setting items is on the increase. As a solution to lighten the burden of user setting, "presetting (manufacturer-defined settings)" and "user-defined settings" are available. A combination of set values used frequently is pre-defined as presetting. A user can save desired settings arbitrarily as user-configured settings. The number of manufacturer-defined settings offered by a manufacturer is not one. The same applies for the number of user-defined settings. That is, a user can choose desired or appropriate one among a plurality of setting combinations for use. For example, the user can make selection among a plurality of print settings such as "Print with light color (or low density) for saving toner", "Print two pages on a face of a single sheet for saving paper (2-up printing)", "Duplex (double, face printing)", and the like. An example of related art is disclosed in JP-A-11-149361.

However, it is necessary to pre-store set value combinations such as manufacturer-defined settings and user-defined settings individually. That is, it is not possible to effect a setting change for a part of setting items set in manufacturer-defined settings and user-defined settings.

Accordingly, in the above example, all of necessary setting combinations such as "Print lightly with two pages on each side of a single sheet in duplex", "Print lightly with two pages on a side of a single sheet in simplex (single side printing)", "Print lightly with one page on each side of a single sheet in duplex", "Print with normal density with two pages on each side of a single sheet in duplex", and the like must be saved separately.

SUMMARY

An advantage of some aspects of the invention is to provide a computer readable storage medium with a printer driver stored therein that makes it possible to effect a setting change for a part of setting items set in manufacturer-defined settings and user-defined settings.

In order to address the above-identified problems without any limitation thereto, a computer readable storage medium in which a printer driver is stored is provided. The printer driver causes a computer to operate as a computing apparatus including: a memorizing section that memorizes a plurality of set value combinations in each of which a set value is associated with each setting item; a selection accepting section that displays information indicating the set value combinations in a selectable manner and accepts selection of at least one set value combination; and a set value changing section that applies, to a part of setting items for which values have already been set, a set value for a setting item included in the set value combination the selection of which has been accepted by the selection accepting section so as to effect a change.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, an exemplary embodiment of the present invention will now be explained in detail.

Figure 1:
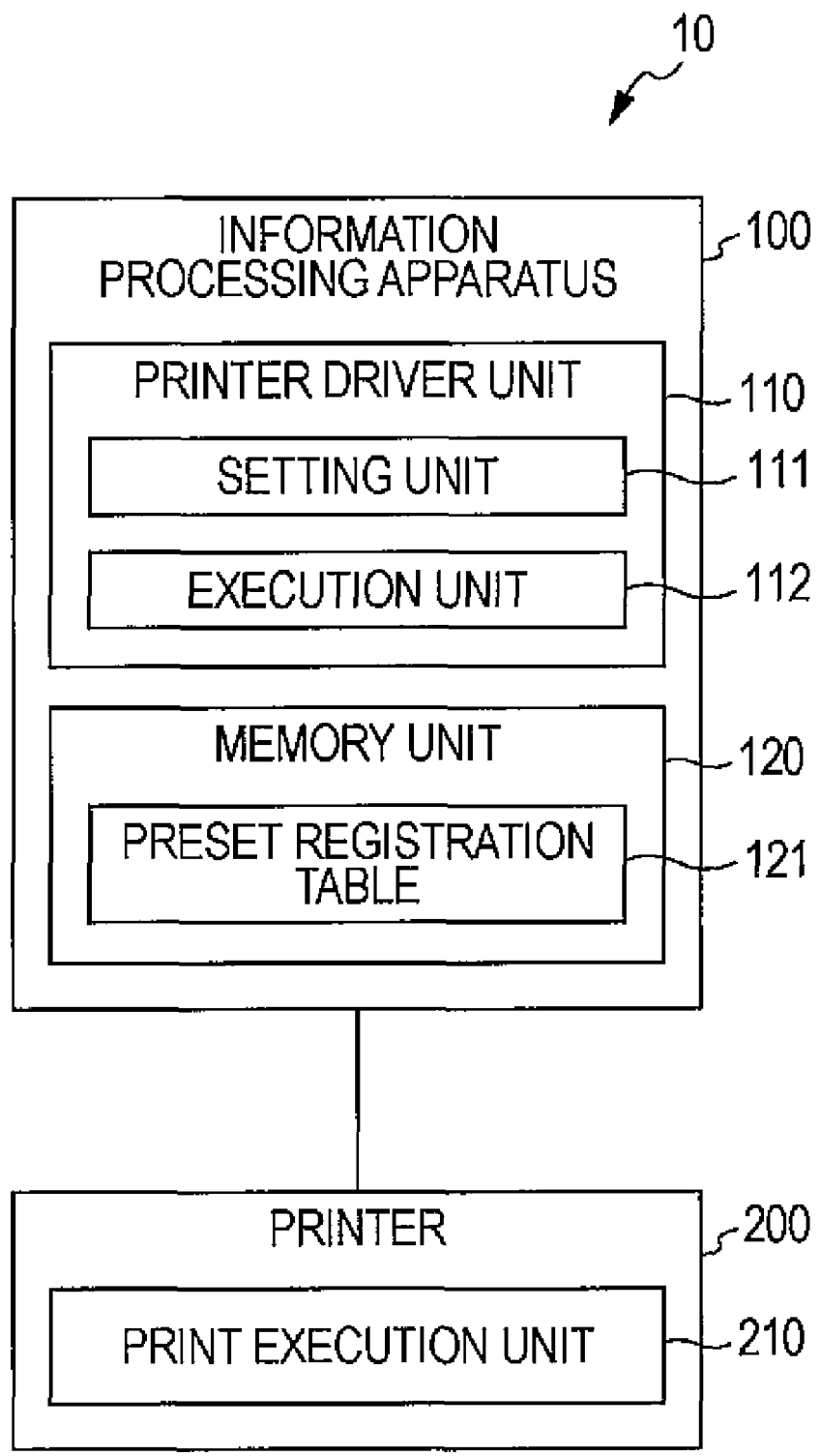
FIG. 1 is a block diagram that schematically illustrates an example of the functional components of a printing system according to an exemplary embodiment of the invention.

FIG. 1 is a block diagram that schematically illustrates an example of the functional components of a printing system 10 according to an exemplary embodiment of the invention. As illustrated in FIG. 1, the printing system 10 includes an information processing apparatus 100 and a printing apparatus 200 that are connected to each other for communication. The printing apparatus 200 is hereinafter referred to as "printer" 200. The information processing apparatus 100 and the printer 200 may be connected to each other via a USB cable or the like. Or, the information processing apparatus 100 and the printer 200 may be connected to each other via a computer network such as the Internet, LAN, or the like.

The information processing apparatus 100 is a general computer that is provided with, for example, a central processing unit (CPU), a random access memory (RAM), a read only memory (ROM), a hard disk, a display device, an input device, a communication interface, and the like. The input device includes a keyboard, a mouse, and the like. The communication interface is used for transmitting data to the printer 200 and receiving data from the printer 200. These components of the computer 100 are not illustrated in the drawing.

As illustrated in FIG. 1, the information processing apparatus 100 includes a printer driver unit 110 and a memory unit 120 as functional blocks thereof. The function of the printer driver unit 110 is implemented as a result of the execution of a computer program (i.e., printer driver). The computer program is loaded into the RAM from, for example, the ROM of the information processing apparatus 100 and is then executed by the CPU. The memory unit 120 is built as a storage device such as a ROM, a hard disk, or the like.

The printer driver unit 110 makes settings for printing performed by the printer 200. In addition, the printer driver unit 110 controls the operation of the printer 200. As illustrated in FIG. 1, the printer driver unit 110 includes a setting unit 111 and an execution unit 112.

The setting unit 111 makes print settings for the printer 200. The print settings made by the setting unit 111 include a plurality of setting items such as print color, paper size, and the like. The setting unit 111 sets a value (i.e., set value) for each setting item.

The setting unit 111 may set each value individually on the basis of instructions given by a user. Or, the setting unit 111 may set values for a plurality of setting items in a batch setting process with the use of default preset values. Therefore, the setting unit 111 has stored registration information on the default preset values in the memory unit 120 in advance. The preset values are pre-stored in a preset registration table 121. A more detailed explanation of the preset registration table 121 will be given later.

The setting unit 111 can apply default preset values that are different from each other or one another to the same setting item in accordance with printing conditions and/or in response to a request made by a user. To apply the different values to the same setting item, the setting unit 111 pre-stores registration information on a plurality of "print formats" in the memory unit 120 (i.e., the preset registration table 121). The print formats include, for example, draft printing, text-and-image printing, WEB printing, N-UP printing, user definition printing, and the like.

The setting unit 111 causes a display device to display a plurality of icons each of which represents the corresponding one of the plurality of print formats on the basis of registration information that is pre-stored in the memory unit 120. When any one or more icons (i.e., at least one icon) are selected by the user, the setting unit 111 sets values for a plurality of setting items in a batch setting process with the use of the registration information on the default preset values for the selected print format(s).

The execution unit 112 generates print data. The execution unit 112 transmits the generated print data to the printer 200 and causes the printer 200 to perform printing on the basis of the print data. The execution unit 112 transmits a control command, which instructs the printer 200 to perform printing on the basis of the print settings made by the setting unit 111, to the printer 200 together with the print data.

As illustrated in FIG. 1, the memory unit 120 stores the preset registration table 121.

The preset values for the print setting items have been stored in the preset registration table 121 in advance.

Figure 2:
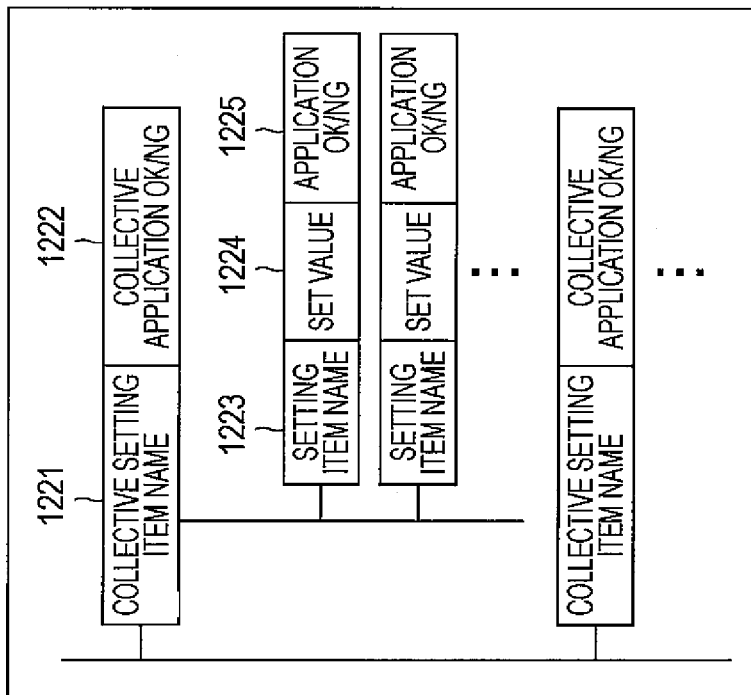
FIG. 2 is a diagram that schematically illustrates an example of the data structure of a preset registration table according to an exemplary embodiment of the invention.

FIG. 2 is a diagram that schematically illustrates an example of the data structure of the preset registration table 121. As illustrated in FIG. 2, the preset registration table 121 is made up of a plurality of records 1216 each of which corresponds to a print format. In each record 1216, identification information 1211 (ID) that is used for identifying the print format, selection information 1212 that indicates the state of the selection of the print format by a user, a print format name 1213 that shows the name of the print format, a category 1214 to which the print format belongs, and setting item information 1215 that is made up of set values for respective setting items of the print format are stored in association therewith.

The identification information (ID) 1211 includes information for identifying the print format. For example, the identification information (ID) 1211 is made up of a predetermined string of characters or the like. The string of characters may be a string of numerals or may include numerals.

The selection information 1212 includes information for identifying a print format that is selected by a user for print execution or print setting. For example, the selection information 1212 is made up of a set of characters such as "ON" that indicates that the corresponding print format is currently in a selected state or a set of characters such as "OFF" that indicates that the corresponding print format is not in a selected state. Or, the selection information 1212 may be an identifier that indicates the state of the selection of the corresponding print format.

The print format name 1213 includes information that indicates the name of the print format. A string of characters (which may include numerals) that shows a name that a user can easily associate with the content of print settings is used for the print format name 1213. For example, "draft printing", "text-and-image printing", "WEB printing", "N-UP printing", and the like are used as the print format name 1213.

The category 1214 includes information for classifying the print format. For example, the category 1214 is made up of a string of characters (which may include numerals) such as "manufacturer-defined (preset)", "user-defined", and the like.

The setting item information 1215 includes a set value that is stored for each of a plurality of setting items that are grouped into the print format.

Specifically, as illustrated in FIG. 2, the setting item information 1215 includes set values stored for the plurality of setting items in a hierarchical structure.

The setting item information 1215 includes collective setting item names 1221 and collective application OK/NG information 1222 that are stored in association therewith. A plurality of setting items is grouped together under the collective setting item name 1221. The collective application OK/NG information 1222 is used for determining whether it is OK to collectively enable possible application of respective set values (default preset values) for all setting items that belong to the group under the collective setting item name 1221 thereto or not. If the collective application OK/NG identifier 1222 is set as OK, in the processing of the setting unit 111 described later, an individual judgment is made for each of the plurality of setting items that belong to the group under the collective setting item name 1221 as to whether it is OK to apply a set value for the setting item thereto with the use of an individual application OK/NG information 1225 mentioned below. On the other hand, if the collective application OK/NG identifier 1222 is set as NG, the indication of the individual application OK/NG information 1225 for each of the plurality of setting items that belong to the group under the collective setting item name 1221 is ignored. Accordingly, it is judged that the value should be applied for none of these setting items. In the illustrated example, the setting item information 1215 includes two collective setting item names 1221. However, the number of the collective setting item names 1221 included in the setting item information 1215 is not limited to two. The number thereof may be one, or three or more.

For each of the plurality of setting items grouped together under the collective setting item name 1221, the setting item information 1215 includes a setting item name 1223, a set value 1224, and the aforementioned individual application OK/NG information 1225 that are stored in association therewith. The setting item name 1223 indicates the name of the setting item. The set value 1224 is a value specified for the setting item. The individual application OK/NG information 1225 is used for determining whether it is OK to apply the set value 1224 thereto or not.

In addition, though not illustrated in the drawing, for each print format (the record 1216), a comment on the printing format (i.e., explanatory text) as well as a print format icon that visualizes the print format (i.e., image data) is stored in association therewith.

The printer 200 is provided with, for example, a CPU, a RAM, a ROM, a network interface, a print engine, an input device such as a button, a touch panel, and the like and a display device such as a display panel or the like. These components of the printer 200 are not illustrated in the drawing. The configuration of the printer 200 is not limited to the above example. For example, the printer 200 may be provided with an application specific integrated circuit (ASIC), which performs specific processing. The printing apparatus 200 is not limited to a printer but may be configured as other apparatus having a printing function. For example, the printing apparatus may be a multi-function apparatus, a facsimile machine, or the like.

The printer 200 includes at least a print execution unit 210 as a functional block thereof. The function of the print execution unit 210 is implemented as a result of the execution of a computer program loaded into the RAM of the printer 200 by the CPU thereof and the operation of the print engine thereof. Or, the function of the print execution unit 210 may be implemented as a result of the operation of a dedicated ASIC or the like.

The print execution unit 210 prints out print data transmitted from the information processing apparatus 100. Specifically, the print execution unit 210 receives print data generated by the execution unit 112 of the printer driver unit 110 of the information processing apparatus 100 as well as a control command for printing. Following the received control command, the print execution unit 210 controls the operation of the print engine for printing out the received print data. In a case where the print data received from the printer driver unit 110 is not available for direct printing, the print execution unit 210 performs predetermined image processing on the received print data to convert the format of the data into one that can be processed for printing. Thereafter, the print execution unit 210 performs print processing.

Figure 3:
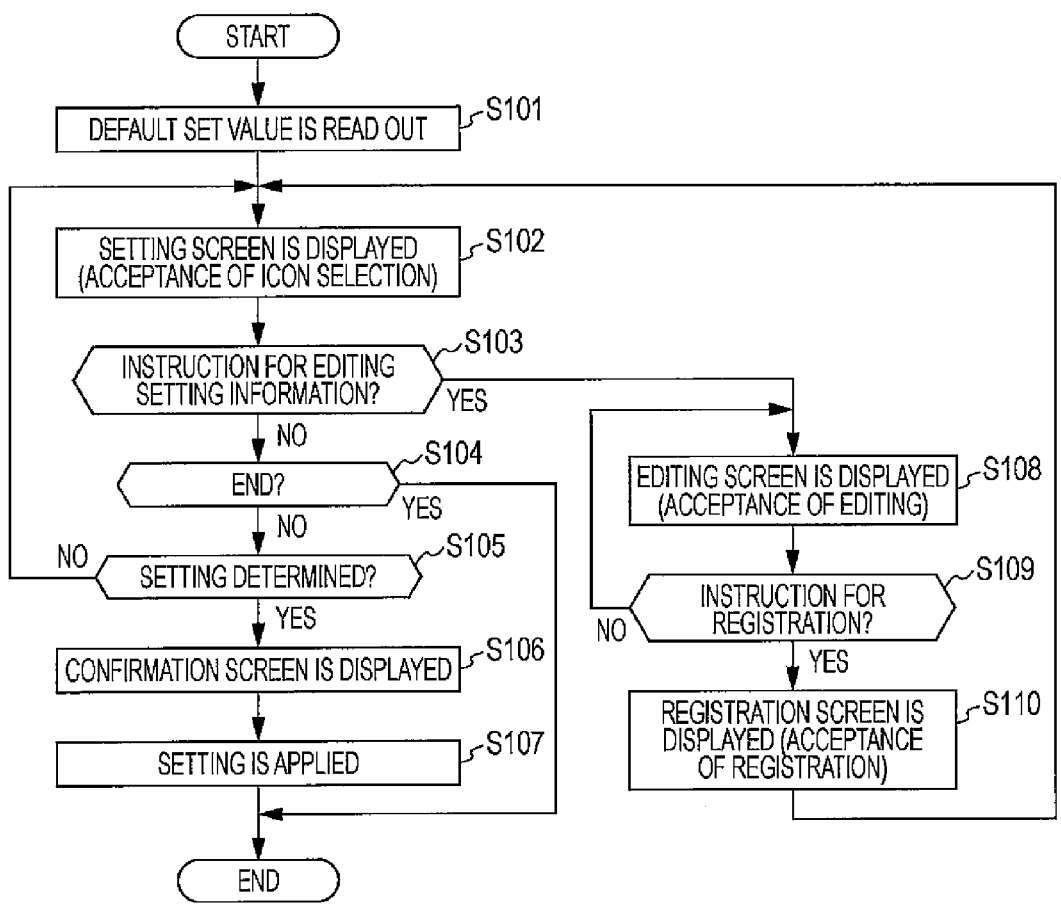
FIG. 3 is a flowchart that schematically illustrates an example of print-setting processing according to an exemplary embodiment of the invention.

Next, the characteristic operation of the printing system 10 that has the above configuration is explained below. FIG. 3 is a flowchart that schematically illustrates an example of print-setting processing performed by the information processing apparatus 100.

When a user operates an input device to give instructions for making print settings, the printer driver unit 110 of the information processing apparatus 100 receives the instructions. Upon receiving the instructions, the printer driver unit starts print-setting processing.

As a first step of the print setting, the setting unit 111 of the printer driver unit 110 reads a default preset value from the preset registration table 121 (step S101). Specifically, the setting unit 111 searches for a record 1216 whose selection information 1212 is set ON in the preset registration table 121. Then, the setting unit 111 reads out the setting item information 1215 that is contained in the retrieved record 1216.

Next, the setting unit causes the display device such as a display panel to display a setting screen 300 (step S102).

Figure 4:
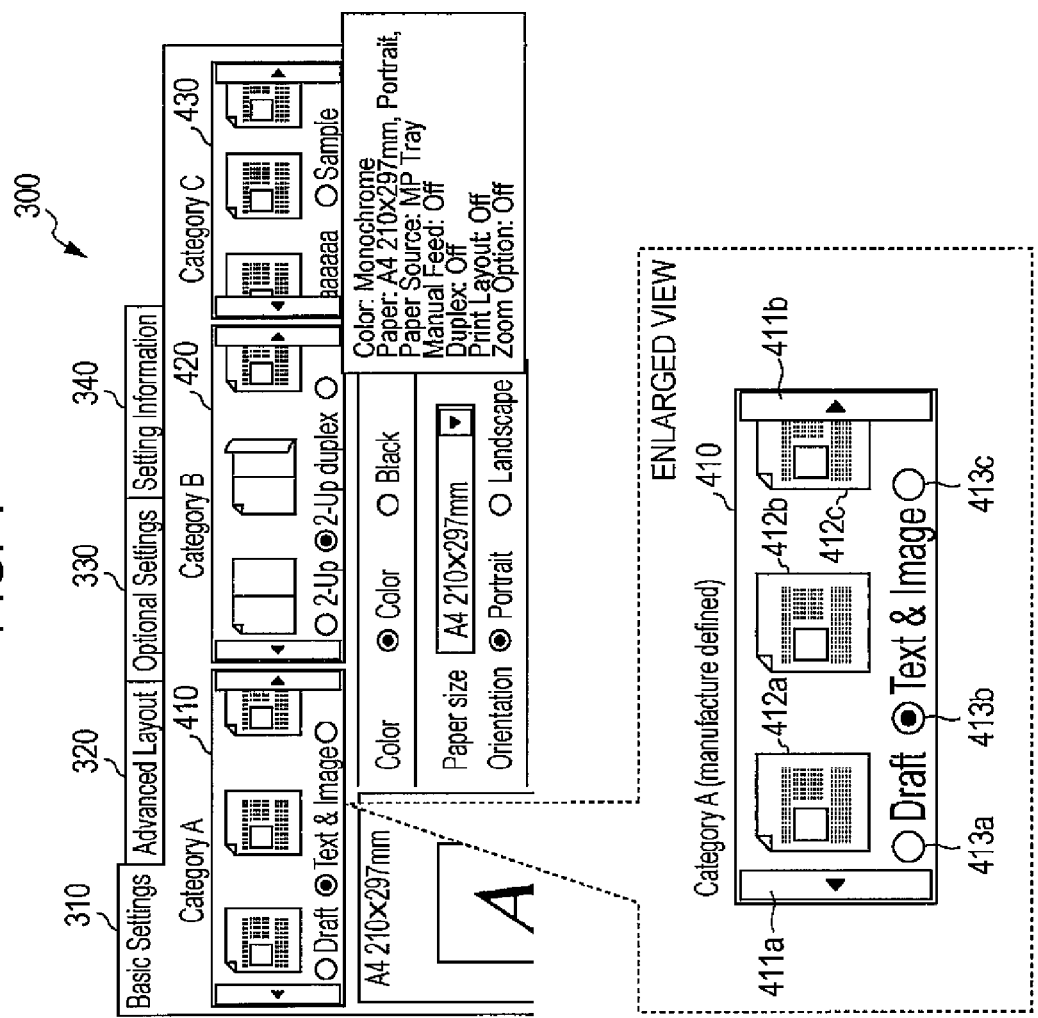
FIG. 4 is a diagram that schematically illustrates an example of a setting screen according to an exemplary embodiment of the invention.

FIG. 4 is a diagram that schematically illustrates an example of the setting screen 300 that is displayed under the control of the setting unit 111. As illustrated in FIG. 4, the setting screen 300 includes a Basic Settings tab 310, an Advanced Layout tab 320, an Optional Settings tab 330, and a Setting Information tab 340. The setting unit 111 causes the display device to display a setting screen for each of the tabs 310, 320, 330, and 340. The setting screens displayed for these tabs differ from one to another. The setting unit 111 accepts various print settings made on these setting screens. For example, when a user selects the Basic Settings tab 310, the setting unit 111 causes the display device to display a setting screen that is used for making basic print settings such as color-print setting, paper-size setting, and the like. Various print settings made on this setting screen are accepted. When the user selects the Setting Information tab 340, the setting unit 111 causes the display device to display a setting screen that is used for, for example, adding/deleting a setting item to/from the plurality of setting items that make up the print format and changing a set value (default preset value) of each setting item. Various print settings made on this setting screen are accepted. When the user selects none of the tabs 310, 320, 330, and 340, the setting unit 111 judges that the Basic Settings tab 310 is currently selected. In this case, the basic setting screen is displayed as illustrated in the example of FIG. 4.

In the setting screen 300, a category area (410, 420, - - - ) is provided for each category under which the print formats fall. In the illustrated example, three category areas 410, 420, and 430 are provided for three categories, that is, Category A, Category B, and Category C. The ratio of the sizes of, the respective category areas 410, 420, and 430 is determined in proportion to the number of the print formats that fall under each category. For example, the ratio of the display widths of the respective category areas 410, 420, and 430 is determined in proportion to the number of the print formats that fall under each category. The setting unit 111 refers to the preset registration table 121 to count the number of the records 1216 that have the same category 1214. Then, depending on the ratio of the number of the records 1216 counted for the respective categories, the ratio of the sizes of the respective category areas 410, 420, and 430, for example, the ratio of the display widths thereof, is determined. Accordingly, the number of the category areas that are displayed on the setting screen 300 is determined on the basis of the number of types of the category 1214 that is stored in the preset registration table 121. Regardless of which tab 310, 320, 330, or 340 described above is currently selected, the category areas 410, 420, and 430 are displayed.

As illustrated in the enlarged view part of FIG. 4, each of the category areas 410, 420, and 430 includes a left scroll button 411*a*, a right scroll button 411*b*, print format icons 412 (*a*, *b*, and *c*), and radio buttons 413 (*a*, *b*, and *c*).

The left scroll button 411*a* is a button that scrolls the print format icons 412 in the category area 410 in order to display other print format icons 412 that are not currently shown in the category area 410. The right scroll button 411*b* is also a button that scrolls the print format icons 412 in the category area 410 in order to display other print format icons 412 that are not currently shown in the category area 410.

As explained above, each of the print format icons 412*a*, 412*b*, and 412*c* is an icon that is associated with a print format (a record 1216) in the preset registration table 121 and displayed for the corresponding print format. The setting unit 111 causes the display device to display the print format icons 412 (*a*, *b*, and *c*) in accordance with the sequential order of the records 1216 that are stored in the preset registration table 121 in the category area (410, 420, 430).

The radio buttons 413*a*, 413*b*, and 413*c* are a set of buttons used for selecting a setting target print format or an editing target print format. At each time when the setting screen 300 is displayed, the setting unit 111 identifies the record 1216 whose setting information 1212 is set ON in the preset registration table 121 (step S101). Then, the setting unit 111 places a dot mark in (i.e., checks) the radio button 413a, 413b, or 413c for the print format corresponding to the identified record 1216.

Referring back to FIG. 3, in a step S102, the setting unit 111 accepts the selection (change) of any radio button 413a, 413b, or 413c in the category area (410, 420, 430).

Subsequently, the setting unit 111 judges whether a user has given instructions for editing setting information on the print format that corresponds to the selected radio button 413a, 413b, or 413c (step S103). Specifically, the setting unit 111 judges that instructions for editing setting information are given when the user selects the Setting Information tab 340 through the manipulation of the input device. The setting unit 111 judges that instructions for editing setting information are not given if manipulation other than the selection of the Setting Information tab 340 is performed by the user.

If the setting unit 111 judges that the editing of setting information on the print format is instructed (step S103: YES), the process proceeds to a step S108. If the setting unit 111 judges that the editing of setting information on the print format is not instructed (step S103: NO), the process proceeds to a step S104.

When the process proceeds to the step S108, the setting unit 111 causes the display device such as a display panel to display an editing screen 500.

Figure 5:
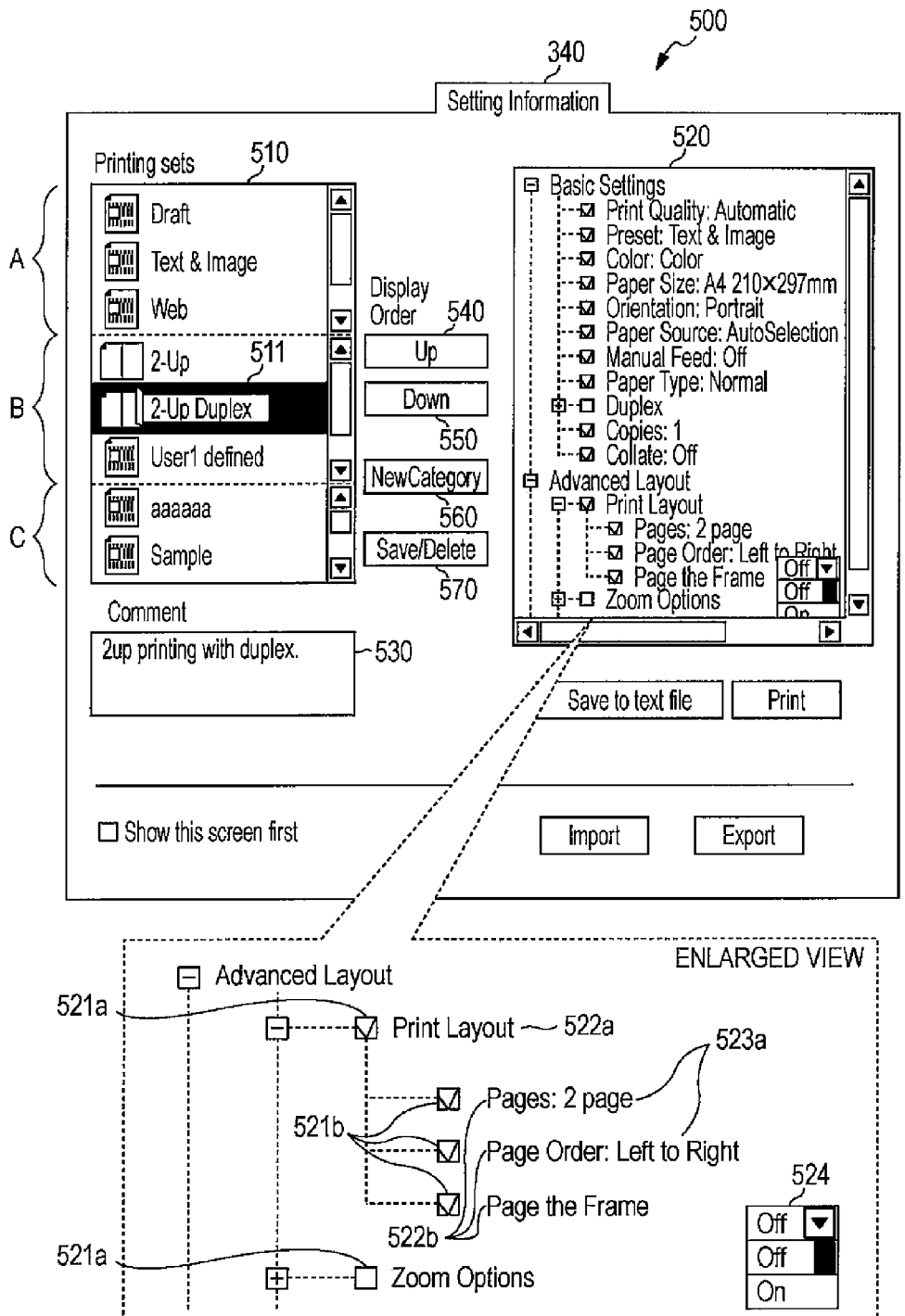
FIG. 5 is a diagram that schematically illustrates an example of an editing screen according to an exemplary embodiment of the invention.

FIG. 5 is a diagram that schematically illustrates an example of the editing screen 500 that is displayed under the control of the setting unit 111 (step S108). As illustrated in FIG. 5, the editing screen 500 includes a print format list 510, a setting item list 520, a comment field 530, a display order UP button 540, a display order DOWN button 550, a New Category button 560, and a Save/Delete button 570.

A list of print format icons each of which indicates the corresponding print format is displayed in the print format list 510. As illustrated therein, each print format icon is displayed in a section area corresponding to a category under which the corresponding print format falls. Dotted lines demarcate these category areas. The print format icon 511 that is currently selected by the user through the operation of the input device is indicated in highlighted display. The setting unit 111 retrieves the record 1216 corresponding to the selected print format icon 511 from the preset registration table 121. In addition, the comment that is linked with the retrieved record 1216 is displayed in the comment field 530.

The order of the arrangement of the print format icons can be changed in the print format list 510.

When a user clicks the display order UP button 540 with the use of the input device, the setting unit 111 moves the print format icon 511 that is currently selected up by one row in the display list. In accordance with the upward shifting of the selected print format icon 511, the setting unit 111 searches for the record 1216 corresponding to the selected print format icon 511 in the preset registration table 121 and changes the sequential position of the found record 1216 that is stored therein. The setting unit 111 may move the print format icon 511 that is currently selected from one category to another. That is, the setting unit 111 may move the selected print format icon 511 across a dotted category partition line.

In like manner, when a user clicks the display order DOWN button 550 with the use of the input device, the setting unit 111 moves the print format icon 511 that is currently selected down by one row in the display list. In accordance with the downward shifting of the selected print format icon 511, the setting unit 111 searches for the record 1216 corresponding to the selected print format icon 511 in the preset registration table 121 and changes the sequential position of the found record 1216 that is stored therein.

A new category can be added to the print format list 510. When the user clicks the New Category button 560 with the use of the input device, the setting unit 111 creates an area for a new category in the print format list 510. A tentative print format icon, for example, a plain print format icon, is displayed in the created area.

A list of setting items for the print format (the print format icon 511) that is currently selected in the print format list 510 is displayed in the setting item list 520. The setting unit 111 retrieves the record 1216 corresponding to the print format icon 511 that is currently selected in the print format list 510 from the preset registration table 121. The setting item list 520 is displayed on the basis of the data structure of the setting item information 1215 that is associated with the retrieved record 1216. That is, the setting unit 111 causes the display device to display a set value for each of the plurality of setting items that are stored as the setting item information 1215 in a hierarchical display structure.

As illustrated in the enlarged view part of FIG. 5, higher-level layer boxes 521a and lower-level layer boxes 521b are displayed in the setting item list 520 in a tree structure. The higher-level layer boxes 521a reflect the set state of the collective application OK/NG information 1222 of the setting item information 1215. The lower-level layer boxes 521b reflect the set state of the individual application OK/NG information 1225 thereof. For example, if the collective application OK/NG identifier 1222 is set as OK, a checkmark is placed in the higher-level layer box 521a. If the individual application OK/NG identifier 1225 is set as OK, a checkmark is placed in the lower-level layer box 521b. If the collective application OK/NG identifier 1222 is set as NG, a blank higher-level layer box 521a is displayed without a checkmark. If the individual application OK/NG identifier 1225 is set as NG, a blank lower-level layer box 521b is displayed without a checkmark.

When a user operates the input device to touch the higher-level layer box 521a or the lower-level layer box 521b that is displayed in the setting item list 520, the setting unit 111 changes the check state of the box. That is, if a checkmark is placed in the box when the user touches the box, the checkmark is removed. If no checkmark is placed in the box when the user touches the box, a checkmark is placed in the box.

As illustrated in the enlarged view part of FIG. 5, a collective setting item name 522a is displayed next to each higher-level layer box 521a in the setting item list 520. A setting item name 522b is displayed next to each lower-level layer box 521b. In addition, a set value 523a is displayed for each lower-level layer box 521b next to the setting item name 522b. The setting unit 111 reads the collective setting item name 1221 out of the preset registration table 121 and then shows the read name as the collective setting item names 522a. In addition, the setting unit 111 reads the setting item name 1223 and the set value 1224 that is associated with the setting item name 1223 out of the preset registration table 121 and then shows the read name and the read value as the setting item name 522b and the set value 523a, respectively.

When the user operates the input device to touch the set value 523a that is displayed in the setting item list 520, the setting unit 111 causes the display device to display a selection box 524 as illustrated in the enlarged view part of FIG. 5. Candidates of applicable set values are presented in the selection box 524 as choices. The setting unit 111 accepts the selection of one set value.

The Save/Delete button 570 is a button that is used for registering a change made on the higher-level layer box 521a, the lower-level layer box 521b, the set value 523a, or the like, which was accepted in the setting item list 520. Or, the Save/

Delete button 570 can be used for deleting the print format that is currently selected in the print format list 510.

The setting unit 111 causes the display device to continuously display the editing screen 500 until instructions for registration are given after the displaying of the editing screen 500. For continuous display, it is judged in a step S109 whether registration is instructed or not.

When the setting unit 111 judges that instructions for registration (or deletion) are given (step S109: YES), the process proceeds to a step S110. Specifically, when the user clicks the Save/Delete button 570 through the manipulation of the input device, the setting unit 111 judges that instructions for registration (or deletion) are given. Accordingly, the process proceeds to the step S110.

When the process proceeds to the step S110, the setting unit 111 causes the display device such as a display panel to display a registration screen 600.

Figure 6:
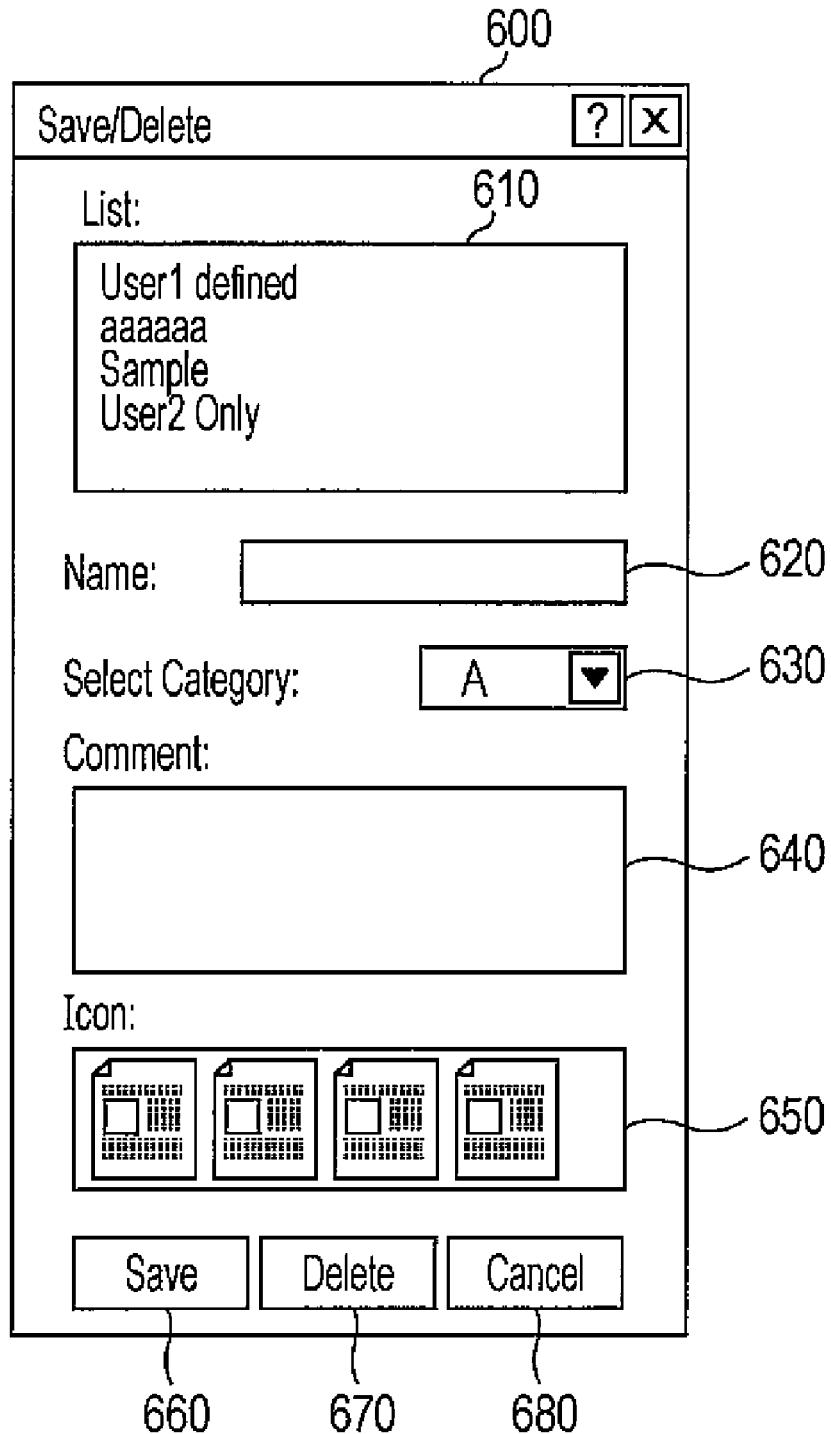
FIG. 6 is a diagram that schematically illustrates an example of a registration screen according to an exemplary embodiment of the invention.

FIG. 6 is a diagram that schematically illustrates an example of the registration screen 600 that is displayed under the control of the setting unit 111 (step S110). As illustrated in FIG. 6, the registration screen 600 includes a registered list 610, a name field 620, a category selection pull-down box 630, a comment creation field 640, an icon assignment field 650, a Save button 660, a Delete button 670, and a Cancel button 680.

A list of the print formats that have already been saved in the preset registration table 121 is displayed in the registered list 610. Specifically, the setting unit 111 reads out the print format names 1213 that are respectively contained in all of the records 1216 stored in the preset registration table 121 and then causes the display device to display the read names therein.

The name of the print format that is selected in the print format list 510 of the editing screen 500, that is, the print format name 1213 thereof, is displayed in the name field 620. When the user desires to rename the print format (i.e., the print format name 1213), the setting unit 111 accepts a change to a desired name, which is inputted through the user's manipulation of the input device. Or, when a new print format is created, the setting unit 111 accepts the naming thereof as desired through the user's manipulation of the input device.

Candidates of categories that are available for selection are presented in the category selection pull-down box 630. The setting unit 111 reads out all types of the category 1214 that are stored in the preset registration table 121 and causes the display device to display the read category types in the category selection pull-down box 630 as available choices. The setting unit 111 accepts the selection of one category.

A comment (i.e., explanatory text) that is to be displayed in the comment field 530 of the editing screen 500 is displayed in the comment creation field 640.

Notwithstanding the above, when a new print format is created, the setting unit 111 accepts the inputting of a desired comment through the user's manipulation of the input device.

In addition to the print format icon of the print format that is selected in the print format list 510 of the editing screen 500, a list of print format icons that are available for assignment (change) is displayed in the icon assignment field 650. The print format icons that are available for assignment have been stored in the memory unit 120 in advance. The setting unit 111 reads the available print format icons out of the memory unit 120 and then causes the display unit to display them in the icon assignment field 650.

The Save button 660 is a button for registering (i.e., recording) set values for the print format that is selected in the print format list 510 of the editing screen 500.

For example, when the user touches the Save button 660 through the manipulation of the input device, the setting unit 111 stores the input content accepted on the editing screen 500 or the registration screen 600 into the preset registration table 121.

Specifically, the setting unit 111 retrieves the record 1216 corresponding to the print format (the print format icon 511) selected in the print format list 510 of the editing screen 500 and then overwrites the print format name 1213 of the retrieved record 1216 with the name that was inputted in the name field 620. In like manner, the setting unit 111 overwrites the category 1214 of the retrieved record 1216 with one that was selected in the category selection pull-down box 630. In addition, the setting unit 111 overwrites the setting item information 1215 of the retrieved record 1216 with data (the higher-level layer boxes 521a, the lower-level layer boxes 521b, the collective setting item names 522a, the setting item names 522b, and the set values 523a) of the setting item list 520. Moreover, the setting unit 111 overwrites the comment (i.e., explanatory text) linked with the retrieved record 1216 with one that was inputted in the comment creation field 640. Furthermore, the setting unit 111 overwrites the print format icon of the print format in the retrieved record 1216 with one that was assigned thereto in the icon assignment field 650. As a result of the processing explained above, various settings on the print format are registered.

The Delete button 670 is a button that is used for deleting the print format that is selected in the print format list 510. For example, when the user touches the Delete button 670 through the manipulation of the input device, the setting unit 111 deletes the record 1216 corresponding to the print format (the print format icon 511) selected in the print format list 510 of the editing screen 500 from the preset registration table 121.

The Cancel button 680 is a button that is used for canceling the setting input of the print format. For example, when the user touches the Cancel button 680 through the operation of the input device, the setting unit 111 discards all of the input content accepted on the editing screen 500 or the registration screen 600.

Referring back to FIG. 3, when the user touches any of the Save button 660, the Delete button 670, and the Cancel button 680 during the display of the registration screen 600 explained above, the setting unit 111 returns the procedure to the step S102. Accordingly, the setting screen 300 is displayed again.

As the other branch of the illustrated processing flow, if the process proceeds from the step S103 to the step S104, that is, if operation other than the selection of the Setting Information tab 340 has been performed by the user on the setting screen 300, the setting unit 111 judges whether the user's command has been issued for the purpose of terminating the ongoing print-setting processing or not (step S104). An End button that is not illustrated in the drawing is provided in the setting screen 300. If the End button is touched, the setting unit 111 judges that the print-setting processing should be terminated. If the End button is not touched, the setting unit 111 judges that instructions other than one for the termination of the print-setting processing are given currently and thus judges that the print-setting processing should not be terminated.

If it is judged that the instructions have been issued for the purpose of terminating the print-setting processing (step S104: YES), the setting unit 111 terminates the print-setting processing.

If it is judged that other instructions that are not intended for terminating the print-setting processing have been issued (step S104: NO), a series of processing from the step S102 inclusive to the step S104 inclusive is repeated until it is judged in a step S105 that the confirmation of the print settings accepted in the step S102, the step S108, or the step S110 is instructed. The setting unit 111 judges that the instructions for confirmation are given when the user touches a Confirm button on the setting screen 300. The Confirm button of the setting screen 300 is not illustrated in the drawing.

When it is judged that the instructions for confirming the print settings are given currently (step S105: YES), the setting unit 111 causes the display device to display a confirmation screen 700 (step S106).

Figure 7:
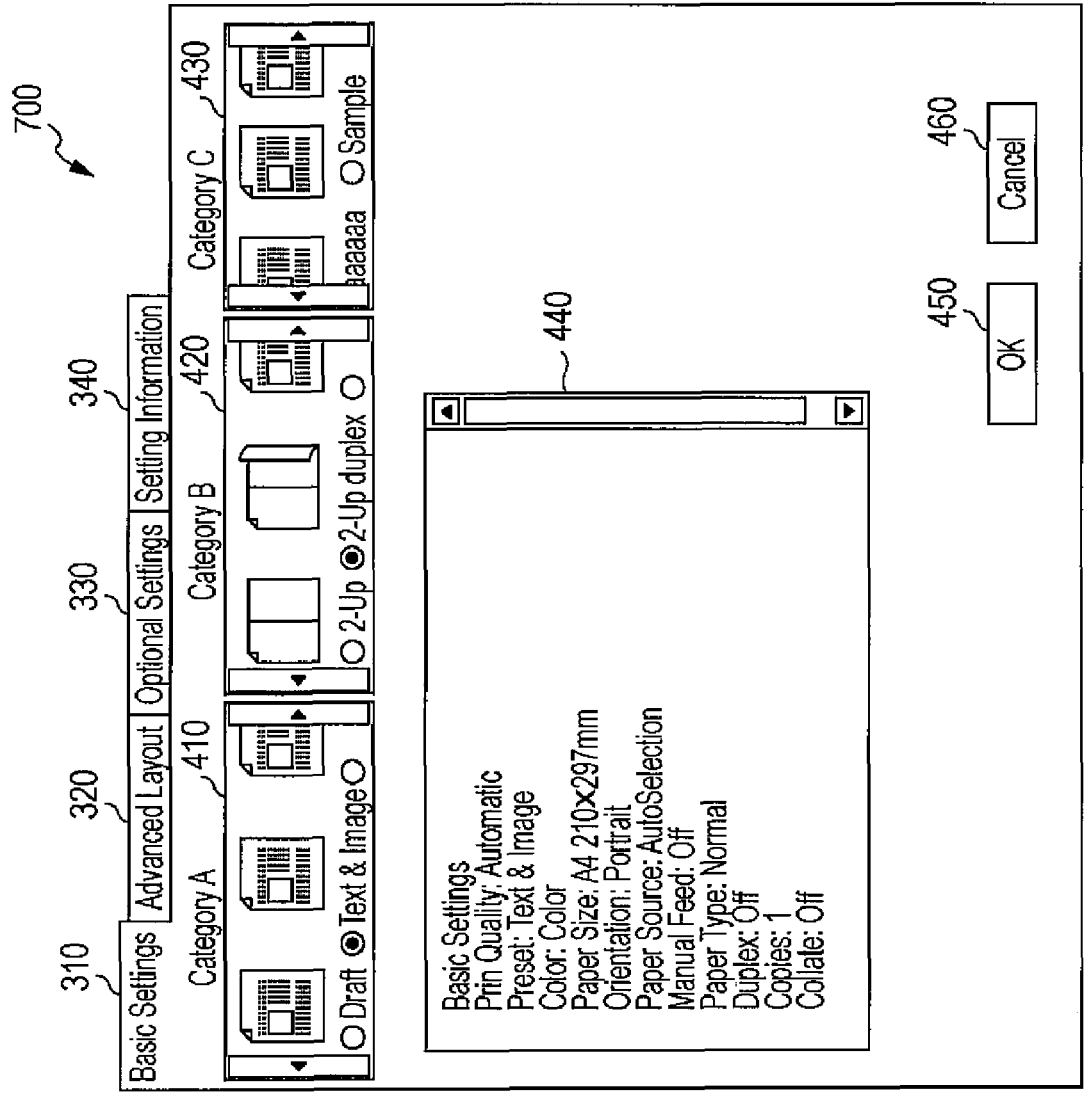
FIG. 7 is a diagram that schematically illustrates an example of a confirmation screen according to an exemplary embodiment of the invention.

FIG. 7 is a diagram that schematically illustrates an example of the confirmation screen 700 that is displayed under the control of the setting unit 111 (step S106). As illustrated in FIG. 7, the confirmation screen 700 includes a setting item confirmation area 440, an OK button 450, and a Cancel button 460. The setting item confirmation area 440 is used for displaying a list of print setting items for the execution of printing.

When the radio button 413 (a, b, c) shown in the category area (410, 420, 430) is selected during the display of the confirmation screen 700, the setting unit 111 causes the display device to display set values for the print format that corresponds to the selected radio button 413 (a, b, c) in the setting item confirmation area 440.

Specifically, the setting unit 111 searches for the record 1216 for the print format that corresponds to the selected radio button 413 (a, b, c) in the preset registration table 121. Then, the setting unit 111 identifies the collective setting item name(s) 1221 that is contained in the setting item information 1215 of the found record 1216 and is associated with the collective application OK/NG information 1222 that is set as OK. In addition, for the plurality of setting items that are grouped together under the identified collective setting item name 1221, the setting unit 111 identifies all of the setting item names 1223 each of which is associated with the individual application OK/NG information 1225 that is set as OK. Then, the setting unit 111 reads out the identified setting item names 1223 and the set values 1224 that are respectively associated with the setting item names 1223. The read setting item names 1223 and the read set values 1224 are displayed in the setting item confirmation area 440.

More than one radio button 413 (a, b, c) may be selected on the confirmation screen 700. In a case where more than one radio button 413 (a, b, c) is selected, the same processing as above for a case where a single radio button 413 (a, b, c) is selected is performed for each of the plurality of selected radio buttons 413 (a, b, c). That is, for each of the plurality of selected radio buttons 413 (a, b, c), the setting unit 111 identifies all of the setting item names 1223 each of which is associated with the individual application OK/NG information 1225 that is set as OK and then reads out the identified setting item names 1223 and the set values 1224 that are respectively associated with the setting item names 1223. In a case where the setting item name 1223 is included redundantly, for example, the set value 1224 associated with the print format corresponding to the last-selected radio button 413 (a, b, c) only is read out and displayed in the setting item confirmation area 440.

When the user touches the OK button 450 during the display of the confirmation screen 700, the process proceeds to a step S107. The setting unit 111 performs processing for applying the set values 1224 displayed in the setting item confirmation area 440 to printing (step S107). The processing performed in this step may be hereinafter referred to as "print-setting application processing". The setting unit 111 stores the set values 1224 displayed in the setting item confirmation area 440 into a predetermined memory area that has been allocated in advance for print setting. At the time of the creation of print data, the execution unit 112 reads the set values 1224 out of the memory area to generate the aforementioned control command.

Upon the completion of the print-setting application processing, the print-setting processing ends.

On the other hand, when the user touches the Cancel button 460 during the display of the confirmation screen 700, the print-setting processing is terminated without performing the print-setting application processing of the step S107.

Since the print-setting processing explained above is performed with the use of the information processing apparatus 100, it is possible to make a setting change for a part of items set on a print-format-by-print-format basis into other set values. That is, it is not necessary for a user to individually set the set values of all setting items. Therefore, it is possible to make print settings easily.

The scope of the invention is not limited to an exemplary embodiment described above. The invention may be modified, adapted, changed, or improved in a variety of modes in its actual implementation.

For example, in the foregoing description of an exemplary embodiment of the invention, it is explained that if the setting item name 1223 is included redundantly when more than one radio button 413 (a, b, c) is selected on the confirmation screen 700, the setting unit 111 reads out the set value 1224 associated with the print format corresponding to the last-selected radio button 413 (a, b, c) only so that it is displayed in the setting item confirmation area 440. However, the scope of the invention is not limited to such an example. For example, in a case where the setting item name 1223 is included redundantly, the setting unit 111 may read out only the set value 1224 that is the last one set in the setting item list 520 of the editing screen 500. In such a modification example, in order to read out the last set value only, the setting unit 111 pre-stores the sequential order of settings made in the setting item list 520 in association with the set values 1224.

The entire disclosure of Japanese Patent Application No. 2008-268323, filed Oct. 17, 2008 is expressly incorporated by reference herein.

What is claimed is:

1. A non-transitory computer readable storage medium in which a printer driver is stored, the printer driver causing the computer to operate as a computing apparatus comprising: a memorizing section that memorizes a plurality of set value combinations in each of which a set value is associated with each setting item; a selection accepting section that displays information indicating the set value combinations in a selectable manner and accepts selection of at least one set value combination; and a set value changing section that applies, to a part of setting items for which values have already been set, a set value for a setting item included in the set value combination the selection of which has been accepted by the selection accepting section so as to effect a change, wherein the printer driver causing the computer to operate as a computing apparatus further comprising: an application OK/NG setting section that sets application OK/NG for a set value for a setting item included in the set value combination, wherein the set value changing section uses a set value that is allowed to be applied by the application OK/NG setting section among set values for setting items included in the set value combination the selection of which has been accepted by the selection accepting section.

2. The non-transitory computer readable storage medium according to claim 1 in which the printer driver recited in claim 1 is stored, the printer driver causing the computer to operate as a computing apparatus that uses the application OK/NG setting section as a section that sets application OK/NG for a setting item included in the set value combination.

3. The non-transitory computer readable storage medium according to claim 1 in which the printer driver recited in claim 1 is stored, the printer driver causing the computer to operate as a computing apparatus that uses the set value changing section as a section that performs set value change processing with the use of a set value of a set value combination selected last for a redundant setting item in a case where more than one set value combination has been selected by the selection accepting section, and in addition thereto, in a case where there is the redundant setting item included in the plurality of set value combinations.

4. The non-transitory computer readable storage medium according to claim 1 in which the printer driver recited in claim 1 is stored, the printer driver causing the computer to operate as a computing apparatus, wherein a category is set in each of the plurality of set value combinations memorized in the memorizing section; and the printer driver causes the selection accepting section to operate as a section that provides, for each same category, a display area that has an area size that is determined on the basis of the number of set value combinations that fall under the category and displays icons that respectively represent the set value combinations that fall under the category in the display area.

5. The non-transitory computer readable storage medium according to claim 1 in which the printer driver recited in claim 1 is stored, the printer driver causing the computer to operate as a computing apparatus further comprising: a user definition registering section that sets a value for each setting item in accordance with instructions given by a user and registers a set value combination that is made up of the set values as a user-defined set value combination.

\* \* \* \* \*